United States Patent [19]

Bettonville et al.

[11] Patent Number: 5,756,587
[45] Date of Patent: May 26, 1998

[54] PROPYLENE POLYMERS AND PROCESS FOR THE PRODUCTION THEREOF

[75] Inventors: Serge Bettonville, Crisnee; Philippe De Rop, Wavre; Claude Franquinet, Brussels, all of Belgium

[73] Assignee: Solvay Polyolefins Europe — Belgium (Société Anonyme, Brussels, Belgium

[21] Appl. No.: 704,509

[22] PCT Filed: Mar. 7, 1995

[86] PCT No.: PCT/EP95/00851

§ 371 Date: Sep. 12, 1996

§ 102(e) Date: Sep. 12, 1996

[87] PCT Pub. No.: WO95/25137

PCT Pub. Date: Sep. 21, 1995

[30] Foreign Application Priority Data

Mar. 17, 1994 [FR] France ................... 94 03250

[51] Int. Cl.$^6$ ................................................ C08F 297/08
[52] U.S. Cl. ................... 525/323; 525/268; 525/314
[58] Field of Search ............................ 525/268, 314, 525/323

[56] References Cited

U.S. PATENT DOCUMENTS

| | | |
|---|---|---|
| 4,210,736 | 7/1980 | Baekelmans et al. . |
| 4,210,738 | 7/1980 | Hermans et al. . |
| 4,987,193 | 1/1991 | Gotoh .............................. 525/313 |
| 5,206,198 | 4/1993 | Costa et al. . |
| 5,438,100 | 8/1995 | Shinozaki et al. ................ 525/240 |

FOREIGN PATENT DOCUMENTS

| | | |
|---|---|---|
| 0202946 | 11/1986 | European Pat. Off. . |
| 0401993 | 12/1990 | European Pat. Off. . |
| 0482855 | 4/1992 | European Pat. Off. . |
| 0536503 | 4/1993 | European Pat. Off. . |
| 87/6968 | 9/1987 | South Africa . |

OTHER PUBLICATIONS

Derwent Abstracts, Abstract No. 84–254528.
Chemical Abstracts, Abstract No. 125417p, vol. 71, No. 13, Dec. 29, 1969.

Primary Examiner—Mark Nagumo
Attorney, Agent, or Firm—Spencer & Frank

[57] ABSTRACT

Propylene block copolymer containing per:

100 parts by weight of a polymer (a) of propylene chosen from homopolymers and copolymers of propylene not containing more than 6% by weight of ethylene and/or of an alpha-olefin having from 4 to 6 carbon atoms, from 1 to 100 parts by weight of a polymer (b) of ethylene chosen from homopolymers and copolymers of ethylene not containing more than 90% by weight of propylene and/or of another alpha-olefin having from 4 to 6 carbon atoms, the said block copolymer additionally containing from approximately 0.001 to approximately 20% by weight of $\alpha,\omega$-diene-derived monomer units with respect to the total weight of the block copolymer.

20 Claims, 1 Drawing Sheet

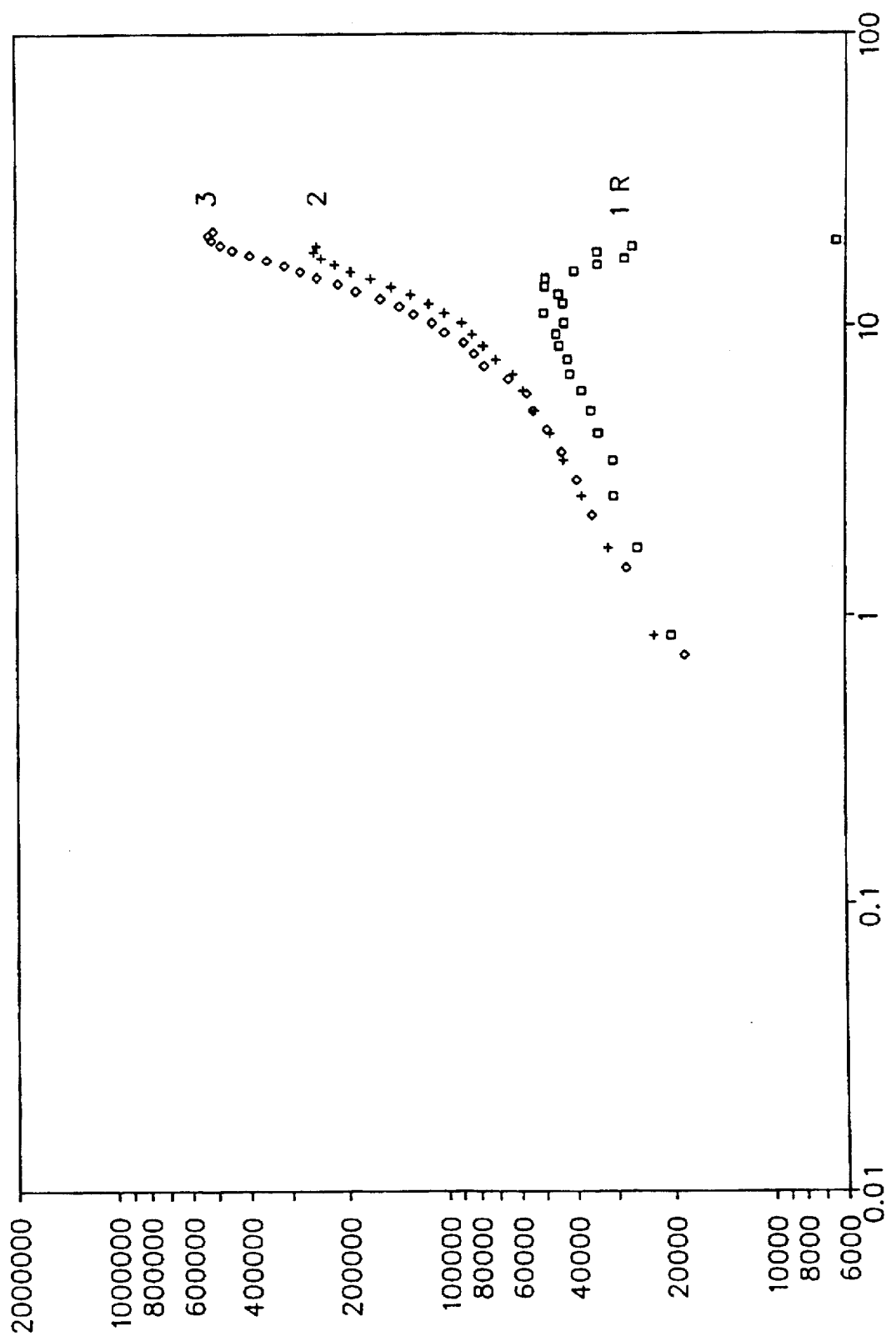

1
PROPYLENE POLYMERS AND PROCESS FOR THE PRODUCTION THEREOF

FIELD OF THE INVENTION

The present invention relates to propylene block copolymers containing a non-conjugated α,ω-diene. It more particularly relates to propylene block copolymers containing a non-conjugated α,ω-diene in at least one of the blocks and to a process for the production of these copolymers.

TECHNOLOGY REVIEW

It is known to increase the impact strength of polypropylene by mixing it with ethylene-propylene elastomers. Nevertheless, as such mixtures are not perfectly homogeneous, they do not exhibit all the desired properties.

Attempts have been made to overcome this problem by copolymerizing propylene with another alpha-olefin, such as, for example, ethylene.

Among propylene copolymers, those which exhibit the best impact strength/stiffness compromise are the copolymers, known as block copolymers, prepared in two-stage processes comprising a first stage of homopolymerization of the propylene or of copolymerization of the propylene with a maximum of 6 molar % of another alpha-olefin, such as ethylene, followed by a second stage of polymerization of ethylene or of copolymerization of ethylene with propylene and optionally another alpha-olefin in proportions such that the amount of ethylene is greater than 10 molar % (see, for example, EP-0,202,946).

The rheological properties of these block copolymers and in particular their melt strength remain unsatisfactory however for specific applications, such as thermoforming or the production of foams.

In addition, when the block copolymers are obtained by polymerization in a diluent, such as a hydrocarbon or one of the monomers maintained in the liquid state, the formation of a significant amount of diluent-soluble polymer is observed in the second polymerization stage, which results in an increase in the viscosity of the polymerization mixture, a deterioration in heat exchanges and agglomeration of the polymer particles with each other or on the walls of the reactor. Under these conditions, it is necessary to limit the amount of polymer produced during this stage, which results in a limitation on the impact strength of the final copolymers. The loss of polymer by solubilization is also responsible for a substantial increase in production costs.

Moreover, the document JP 59/155416 discloses propylene block copolymers in which each of the blocks contains from 1 to 30% by weight of 4- or 5-methyl-1,4-hexadiene. These copolymers exhibit good impact strength and are chemically reactive.

SUMMARY OF THE INVENTION

The present invention relates to propylene block copolymers which are different from those described in the prior art and which exhibit many advantages with respect to the latter.

To this end, the present invention relates to a propylene block copolymer containing per:

100 parts by weight of a polymer (a) of propylene chosen from homopolymers and copolymers of propylene not containing more than 6% by weight of ethylene and/or of an alpha-olefin having from 4 to 6 carbon atoms, from 1 to 100 parts by weight of a polymer (b) of ethylene chosen from homopolymers and copolymers of ethylene not containing more than 90% by weight of propylene and/or of another alpha-olefin having from 4 to 6 carbon atoms, the said block copolymer additionally containing from approximately 0.001 to approximately 20% by weight of α,ω-diene-derived monomer units with respect to the total weight of the block copolymer.

BRIEF DESCRIPTION OF THE DRAWING

The FIGURE illustrates the variation in the elongational viscosity in the molten state (expressed in Pa.s) as a function of the elongation time (expressed in s) for elongation rate gradients of $0.1 \text{ s}^{-1}$.

DETAILED DESCRIPTION OF THE INVENTION

The propylene block copolymers according to the present invention most often contain at least 5 parts by weight and preferably at least 10 parts by weight of polymer (b) per 100 parts by weight of polymer (a). The copolymers according to the invention which contain at least 20 parts by weight of polymer (b) per 100 parts by weight of polymer (a) give good results. The amount of polymer (b) is in addition not generally greater than 90 parts by weight. Good results are obtained when the amount of polymer (b) is less than or equal to 80 parts by weight per 100 parts of polymer (a).

The polymer (a) is generally a homopolymer of propylene or a copolymer of propylene and of ethylene not containing more than 3% by weight of ethylene. Good results are obtained when the polymer (a) is a homopolymer of propylene.

The polymer (b) is generally a copolymer of ethylene. It is most often a copolymer of ethylene containing at least 30%, preferably at least 40%, by weight of propylene. The propylene concentration in the polymer (b) is in addition generally less than or equal to 70% by weight, more particularly less than or equal to 60% by weight.

The block copolymers according to the present invention contain, in addition to the monomer units derived from propylene, from ethylene and optionally from an alpha-olefin, from approximately 0.001 to approximately 20% by weight of monomer units derived from an α,ω-diene with respect to the total weight of the block copolymer.

α,ω-Dienes denote diolefins containing two end carbon-carbon double bonds. The α,ω-dienes which can be used in the block copolymers according to the invention generally contain from 6 to 30 carbon atoms. The preferred α,ω-dienes contain at least 7 carbon atoms. Most often, they do not contain more than 15 carbon atoms. Mention may be made, as examples of these compounds, of 1,6-heptadiene, 1,7-octadiene, 1,8-nonadiene, 1,9-decadiene, 1,10-undecadiene, 1,11-dodecadiene, 1,12-tridecadiene and 1,13-tetradecadiene. Among these compounds, 1,7-octadiene, 1,8-nonadiene and 1,9-decadiene give good results. 1,9-Decadiene is more particularly preferred.

It is obvious that the block copolymers according to the invention which contain monomer units derived from one or from a number of α,ω-dienes also come within the scope of the present invention.

The concentration of α,ω-diene-derived monomer units in the block copolymers according to the present invention is generally greater than or equal to approximately 0.01% by weight with respect to the total weight of the block copolymer. This concentration is preferably greater than or equal to approximately 0.02% by weight with respect to the total weight of the block copolymer. Most often, the concentration of α,ω-diene-derived monomer units is less than or equal to approximately 10% by weight with respect to the total weight of the block copolymer. Good results are obtained when it is not greater than approximately 5% by weight with respect to the total weight of the block copolymer. The block copolymers in which the concentration of α,ω-diene-derived monomer units is from 0.02 to 10% by weight with respect to their total weight are highly suitable.

The preferred block copolymers are generally such that the α,ω-diene-derived monomer units are present solely in the polymer (b).

Consequently, the propylene block copolymers according to the present invention most often contain per:

100 parts by weight of a polymer (a) of propylene chosen from homopolymers and copolymers of propylene not containing more than 6% by weight of ethylene and/or of an alpha-olefin having from 4 to 6 carbon atoms, from 1 to 100 parts by weight of a polymer (b) of ethylene chosen from ethylene copolymers containing at least 30% and not more than 70% by weight of propylene and additionally containing from approximately 0.001 to approximately 20% by weight of α,ω-diene-derived monomer units with respect to the total weight of the block copolymer.

Very particularly preferred block copolymers contain per:

100 parts by weight of a polymer (a) which is a homopolymer of propylene, from 10 to 80 parts by weight of a polymer (b) which is an ethylene copolymer containing from 40 to 60% by weight of propylene and in addition from approximately 0.02 to approximately 5% by weight of monomer units derived from an α,ω-diene.

The block copolymers according to the present invention possess the usual properties of block copolymers, such as a good stiffness/impact strength compromise, good impact strength at low temperature, and the like. The stiffness/impact strength compromise of the block copolymers according to the invention is generally superior to that of the block copolymers in which the first block is a propylene homopolymer and in which the second block is a propylene-ethylene elastomer.

They in addition exhibit, due to the presence of monomer units derived from the α,ω-diene, a relatively large number of branchings which confers on them a good melt strength characterized by a high elongational viscosity at low rate gradient.

These block copolymers also exhibit, in the molten state, an increase in the resistance to deformation during elongation or extension. Such a phenomenon is generally known as "stress hardening". It can easily be characterized by determining, for a given temperature and a given elongation rate, the variation in the elongational viscosity of the block copolymer in the molten state as a function of the elongation time. When subjected to such tests, the block copolymers according to the present invention exhibit an increase in the elongational viscosity until the molten polymer mass ruptures, this rupture generally being brittle.

When subjected to these same tests, the block copolymers of the prior art do not exhibit such a phenomenon.

These different properties make the block copolymers according to the present invention particularly suitable for being shaped by extrusion or by injection and in particular by extrusion blow-moulding or injection blow-moulding. These block copolymers are also suitable for being used by thermoforming or coating. They are also highly suitable for the formation of foams.

The block copolymers according to the present invention in addition exhibit a wide range of melt flow indices (MFI, measured according to ASTM standard D 1238 (1986)) and can exhibit smaller MFI values than those usually encountered for the block copolymers of the prior art. For this reason, the block copolymers according to the present invention which exhibit an MFI of less than 1 g/10 min, in particular of less than 0.7 and more particularly of less than 0.4 g/10 min, constitute an additional aspect of the invention. These specific block copolymers are particularly well suited to applications requiring very good melt strength, as described above.

Finally, the block copolymers according to the present invention generally also exhibit unsaturations arising from the incorporation, in the polymer chains, of the α,ω-diene-derived units. These unsaturations make it possible to graft polar monomers, such as, as non-limiting example, maleic anhydride, without significant degradation of the polymer. It is thus possible to improve the printability properties of the block copolymers, their adhesion to different substrates and the adhesion of paint on the articles obtained from these block copolymers. These unsaturations can also be used to obtain, by appropriate means, good compatibility between the polymers (a) and (b) constituting the block copolymer.

Such uses consequently also constitute additional aspects of the present invention.

The present invention also relates to a process for producing these block copolymers. The block copolymers according to the present invention are generally obtained according to a process comprising at least two successive polymerization stages during which the polymers (a) and (b) are respectively formed.

The process according to the present invention consequently comprises at least two successive polymerization stages in which use is made, under polymerizing conditions, in the presence of a catalytic system, of mixtures of monomers containing:

in the first stage, propylene and optionally up to approximately 5% by weight of ethylene and/or of an alpha-olefin having from 4 to 6 carbon atoms and/or up to approximately 50% by weight of α,ω-diene with respect to the combined monomers used in this stage, and in the second stage, ethylene and optionally up to 95% by weight of propylene and/or of another alpha-olefin having from 4 to 6 carbon atoms and/or up to approximately 50% by weight of α,ω-diene with respect to the combined monomers used in this stage, at least one of these two stages being carried out while making use of a mixture of monomers containing at least 0.005% by weight of α,ω-diene.

The minimum amount of α,ω-diene used in at least one of these two stages is generally approximately 0.01% by weight and more particularly approximately 0.1% by weight.

The amount of α,ω-diene used in at least one of these two stages generally does not exceed 30% by weight and more particularly does not exceed 20% by weight of the mixture of monomers used in this or these stages.

Generally, the α,ω-diene is used at least in the second polymerization stage. Processes giving good results are such that use is made, as monomers, of:

in the first stage, propylene which can optionally contain up to approximately 5% by weight of ethylene and/or of an alpha-olefin having from 4 to 6 carbon atoms and/or up to approximately 50% by weight of α,ω-diene with respect to the combined monomers used, and in the second stage, a mixture of ethylene, of propylene and of α,ω-diene containing up to approximately 90% by weight of propylene and up to approximately 50% by weight of α,ω-diene with respect to the combined monomers used in this stage.

The amount of propylene used in this second stage is in addition most often at least approximately 50% by weight and more particularly at least approximately 80% by weight.

The α,ω-diene is preferably used exclusively in the second polymerization stage.

The process according to the present invention is generally carried out so that, in the second stage, from 1 to 100 parts by weight of polymer are formed per 100 parts by weight of polymer formed in the first stage.

The first and the second stage are in addition most often carried out under conditions such that the respective amounts of polymer formed are those described above with respect to the polymers (a) and (b) of the block copolymers according to the invention.

The two polymerization stages of the process according to the invention can be carried out successively in the same reactor. The second stage is then carried out in the presence of the polymer formed in the first stage and after having completely or partially removed the unreacted monomers. These two stages can also be carried out in two reactors arranged in series. The second stage is then carried out in the second reactor in the presence of the polymer formed in the first stage and after having completely or partially removed the unreacted monomers arising from the first reactor.

The polymerization process according to the present invention is advantageously carried out in two reactors in series.

The first stage of the process according to the present invention is generally carried out in the absence of alpha-olefin having 4 to 6 carbon atoms. In addition, good results are obtained when use is not made of ethylene when this stage is carried out.

The first stage of the process according to the invention is preferably a stage of homopolymerization of propylene.

The monomers used during the second stage are generally ethylene, propylene and the α,ω-diene. Moreover, good results are obtained when the respective amounts of ethylene and of propylene used are such that the ratio by weight of these monomers in the polymer formed during this stage is greater than or equal to 0.4 and more particularly greater than or equal to 0.65. In addition, these amounts are most often such that the ratio by weight of these monomers in the polymer formed during this stage is less than or equal to 2.4, preferably less than or equal to 1.5.

The amount of α,ω-diene used in the process according to the invention is generally such that the overall composition of the block copolymer which is formed therein is that described above with respect to the block copolymers according to the invention.

In the processes according to the present invention, the polymerization can be carried out according to any known process. This polymerization can be carried out in solution or in suspension in an inert hydrocarbon diluent generally chosen from liquid aliphatic, cycloaliphatic and aromatic hydrocarbons such as, for example, liquid alkanes and isoalkanes, benzene and its derivatives. Hydrocarbon diluents preferentially used are: butane, isobutane, hexane, heptane, cyclohexane, methylcyclohexane or their mixtures. Hexane and heptane are highly suitable. It is also possible to carry out the polymerization in the monomer or in one of the monomers maintained in the liquid state or alternatively in the gas phase.

It is also possible to carry out the first and the second stage according to two different processes.

Advantageously, at least the second stage is carried out in suspension in a hydrocarbon solvent such as described above.

The polymerization temperature is generally chosen from 20° to 200° C. and preferably from 50° to 90° C. The pressure is most often chosen between atmospheric pressure and 50 atmospheres. The temperature and the pressure are, of course, a function of one another and of the nature of the polymerization process used.

The preferred process according to the present invention comprises two polymerization stages carried out in suspension in a hydrocarbon solvent.

In this specific case, the amounts of monomers used in the first stage are such that the ratio of the molar fractions of ethylene and of propylene in the liquid phase is less than or equal to approximately 0.015 and the ratio of the molar fractions of α,ωdiene and of propylene in the liquid phase is less than or equal to approximately 5.

Moreover, the amounts of monomers used in the second stage are such that the ratio of the molar fractions of ethylene and of propylene in the liquid phase is greater than or equal to approximately 0.06 and less than or equal to approximately 0.14 and the ratio of the molar fractions of α,ω-diene and of propylene in the liquid phase is less than or equal to 5.

Good results are obtained when the amounts of monomers used for producing the block copolymers according to the invention are such that:

in the first stage, the ratio of the molar fractions of ethylene and of propylene in the liquid phase is less than or equal to approximately 0.015 and the ratio of the molar fractions of α,ω-diene and of propylene in the liquid phase is less than or equal to approximately 5, and in the second stage, the ratio of the molar fractions of ethylene and of propylene in the liquid phase is greater than or equal to approximately 0.06 and less than or equal to approximately 0.14 and the ratio of the molar fractions of α,ω-diene and of propylene in the liquid phase is less than or equal to approximately 5.

In the first stage, the ratio of the molar fractions of ethylene and of propylene in the liquid phase is preferably less than or equal to approximately 0.006. When use is made of an α,ω-diene in the first stage, the amounts of monomers used are most often such that the ratio of the molar fractions of α,ω-diene and of propylene in the liquid phase is less than or equal to approximately 2.5 and more particularly less than or equal to approximately 1.5. Preferably, ethylene is not used. Good results are obtained when α,ω-diene is not used in the first stage. The best results are obtained when exclusively propylene is used in the first stage.

In the second stage, the ratio of the molar fractions of ethylene and of propylene in the liquid phase is preferably less than or equal to approximately 0.12. In addition, it is most often greater than or equal to approximately 0.08. The amounts of α,ω-diene used in this second stage are most often such that the ratio of the molar fractions of α,ω-diene and of propylene in the liquid phase is less than or equal to approximately 2.5, more particularly less than or equal to approximately 1.5. In addition, this ratio is generally at least $2\times10^{-4}$, most often at least $2\times10^{-3}$ and preferably at least $5\times10^{-3}$.

When the polymerization is carried out in a hydrocarbon diluent, it is noticed, surprisingly, that the presence of the α,ω-diene results in a decrease in the amount of polymer soluble in the polymerization mixture. Such behaviour is particularly advantageous during the production of the polymer (b). In fact, it makes possible greater incorporation of the elastomer block in the final block copolymer, without problems of adhesion of the polymer particles to one another and/or on the walls of the reactor being observed. Block copolymers are thus easily obtained, containing a greater proportion of elastomer fraction, which possess a particularly high impact strength. Such a phenomenon is also observed when the polymerization is carried out in one of the monomers maintained in the liquid state.

Moreover, at a constant content of polymer (b), the block copolymers which contain an $\alpha,\omega$-diene are obtained with a better economical yield and exhibit a better morphology.

The catalytic systems which can be used in the processes according to the present invention generally comprise a catalytic solid comprising at least one transition metal belonging to the group IVb of the Periodic Table and an activator generally chosen from organoaluminium compounds.

These catalytic systems are well known to the person skilled in the art.

The preferred catalytic systems according to the present invention contain, as catalytic solid, a complexed solid based on titanium trichloride (TiCl$_3$) as described, for example, in United States Patents U.S. Pat. No. 4,210,738, U.S. Pat. No. 4,210,736 and U.S. Pat. No. 5,206,198 (Solvay) and in Patent Application EP-A-261,727 (Solvay), the contents of which are incorporated by reference in the present description. It proves to be advantageous, in order to obtain block copolymers exhibiting a particularly beautiful morphology, to use catalytic solids which have in addition been subjected to a prepolymerization treatment which comprises bringing them into contact with an alpha-olefin, such as, preferably, propylene or ethylene, under polymerizing conditions, so as to obtain solids containing at least 50% by weight of polymer with respect to the weight of titanium chloride. The maximum amount of prepolymer is not critical. For economical reasons, it is preferable for it not to be greater than 2000% by weight with respect to the TiCl$_3$. The amount of polymer produced during this stage is preferably greater than 100 g per kg of TiCl$_3$. Amounts of prepolymer of less than 1000 g per kg of TiCl$_3$ give satisfactory results. The prepolymerization is generally carried out at the end of the preparation of the catalytic solid. It can also be carried out in a polymerization stage directly preceding the stages of production of the polymers (a) and (b).

The organoaluminium activator is generally chosen from the compounds corresponding to the formula:

in which
R$^1$ is a hydrocarbon radical containing from 1 to 18 carbon atoms;
X is a halogen; and
n is a number such that $0<n\leq 3$.

Surprisingly, it is found that, when the catalytic solid is a solid based on TiCl$_3$, the properties of the block copolymers depend on the nature of the catalytic system used in their production and in particular on the nature of the organoaluminium activator.

Thus, generally, the use of a halogenated organoaluminium activator results in block copolymers preferentially exhibiting branched polymer chains which confer on them the advantageous rheological properties also described above.

Moreover, the use of a non-halogenated organoaluminium activator, such as, for example, a trialkylaluminium, in addition promotes the presence of unsaturations in the polymer chains which gives rise, optionally after chemical conversion, to the adhesion and printability properties described above.

For this reason, the production process according to the present invention has the advantage of being able, by simple modification of the nature of the activator, to result in the production of block copolymers exhibiting different properties.

The catalytic systems which can be used for the production of the block copolymers according to the present invention can also contain at least one third constituent known for improving their stereospecificity and/or their activity.

The various constituents of the catalytic systems which can be used in the processes according to the present invention are generally all introduced during the first polymerization stage.

The total amount of the various constituents of the catalytic systems which can be used according to the present invention is not critical and forms part of what is generally known to a person skilled in the art. The total amount of activator used is generally greater than 0.1 mmol per liter of diluent, of liquid monomer or of reactor volume, preferably greater than 0.5 mmol per liter. When the catalytic solid is a catalytic solid based on TiCl$_3$, the amount of catalytic solid used is determined as a function of its TiCl$_3$ content. It is most often chosen so that the concentration of TiCl$_3$ in the polymerization mixture is greater than 0.01 mmol per liter of diluent, of liquid monomer or of reactor volume and preferably greater than 0.05 mmol per liter. The ratio of the amount of organoaluminium compound to the amount of catalytic solid based on TiCl$_3$ is generally chosen so that the molar ratio of the activator to the TiCl$_3$ is between 0.5 and 20, preferably between 1 and 15. The best results are obtained when the molar ratio is between 2 and 12.

The average molecular mass of the block copolymers according to the present invention can be adjusted by the addition to the polymerization mixture of one or a number of agents for adjusting the average molecular mass, such as hydrogen, diethylzinc, alcohols, ethers and alkyl halides. Hydrogen is particularly well suited.

EXAMPLES

The following examples serve to illustrate the invention. The elongational viscosity of the block copolymers obtained in these examples is determined by means of a rheometer marketed by Rheometrics under the name Rheometrics Extensional Rheometer RER-9000. The curves of the variation in the elongational viscosity in the molten state (expressed in Pa.s) as a function of the elongation time (expressed in s) for elongation rate gradients of 0.1 s$^{-1}$ are reproduced in the single appended figure. These curves were recorded at 190° C. The curve 1R relates to Example 1R and the curves 2 and 3 relate respectively to Examples 2 and 3. The meaning of the symbols used in these examples, the units expressing the quantities mentioned and the methods for measuring these quantities are explained below.

prod=Catalytic productivity expressed conventionally in grams of polymer obtained per gram of TiCl$_3$ contained in the catalytic solid. This activity is assessed indirectly from the determination of the residual titanium content in the polymer by X-ray fluorescence.

Sol=Amount of polymer soluble in the polymerization mixture expressed as % by weight with respect to the total amount of polymer collected.

AD=Apparent density of the insoluble polymer expressed in g/dm$^3$.

MFI=Melt flow index measured under a load of 2.16 kg at 230° C. and expressed in g/10 min (ASTM standard D 1238 (1986)).

Flex. Mod.=Flexural modulus of the block copolymers measured according to ISO standard 178 (1993) expressed in MPa.

g=Torsional stiffness modulus of the block copolymers, measured at 100° C. and for an angle of torsion of 60° C. of arc, the temperature of the mould being set at 70° C. and the duration of conditioning at 5 minutes (ASTM standard D 1043 (1987)). This modulus is expressed in daN/cm$^2$.

Izod=Measurement of the resilience of the polymers, expressed in kJ/m$^2$, measured according to ISO standard 180/1A (1993).

Embrit. Temp.=Embrittlement temperature of the polymers measured according to ASTM standard D 746, expressed in ° C.

EXAMPLE 1R

This example is given by way of reference. It illustrates the block copolymers not containing α,ω-diene.

A—Preparation of the Catalytic Solid 90 ml of hexane and 60 ml of TiCl$_4$ are introduced, under a nitrogen atmosphere and with stirring, into an 800 ml reactor. This hexane/TiCl$_4$ solution is cooled to 0 (±1)° C. and a solution composed of 190 ml of hexane and of 70 ml of diethylaluminium chloride (DEAC) is added thereto over 4 hours, a temperature of 0° C. being maintained in the reactor.

The reaction mixture, composed of a suspension of fine particles, is then kept stirring at this temperature for 15 min, is then brought over 1 hour to 25° C. and maintained for 1 hour at this temperature before being brought over approximately 1 hour to 65° C. The mixture is kept stirring for 2 hours at 65° C., is then cooled to approximately 55° C. and propylene is introduced, into the gaseous head space of the reactor, under a pressure of 2 bars. This introduction is continued for a time (approximately 45 min) sufficient to obtain, per kg of final solid, 65 g of polymerized propylene. The suspension of the thus prepolymerized solid is then cooled to 40° C. and washed with hexane.

The reduced solid is then suspended in 456 ml of hexane and 86 ml of diisoamyl ether (DIAE) are added thereto. The suspension is stirred at 250 rev/min for 1 hour at 50° C. and then separated by settling. After having removed the supernatant, the solid is resuspended in 210 ml of hexane and 52 ml of TiCl$_4$ are added thereto. The suspension is then kept stirring (150 rev/min) at 75° C. for 2 hours. After washing, the complexed solid based on TiCl$_3$ is resuspended in hexane (in the proportion of 4 ml of hexane per gram of solid) and brought into contact with 120 ml of a solution containing, per liter of hexane, 80 g of DEAC and 176 g of n-octadecyl 3-(3',5'-di-tert-butyl-4'-hydroxyphenyl) propionate.

On completion of addition, the suspension is kept stirring for 1 hour at 30° C. before introducing propylene under a pressure of 2 bars for a time (approximately 30 min) sufficient to obtain 170 g of PP per kg of final dry product.

The catalytic solid contains, after washing and drying, 630 g of TiCl$_3$ per kg.

B. Preparation of the Block Copolymer

The following are introduced, under a dry nitrogen flow, into a predried 5 l autoclave:

1.5 liters of hexane, 700 mg of DEAC, 20 mg of ethyl benzoate.

The autoclave is then heated to 60° C. and repressurized with propylene to atmospheric pressure before successively introducing therein a hydrogen pressure of 1 bar, a propylene pressure of 4 bars and an amount of catalytic solid as described in part A sufficient for the amount of TiCl$_3$ introduced into the reactor to be approximately 120 mg.

The reactor is maintained at 60° C. for 3 hours while supplying it with propylene so as to keep the pressure in the reactor constant.

Under these conditions, the molar fraction of propylene in the liquid phase is 0.25.

After polymerizing for 3 hours, the temperature of the autoclave is brought to 45° C. while degassing it to a pressure of 3 bars.

Approximately 0.03 bar of hydrogen is then introduced and the pressure is adjusted, by means of propylene, to 3.1 bars and then, by addition of ethylene, to 4.6 bars.

The polymer (b) is obtained by polymerizing under these conditions for 1 hour and by keeping the composition of the gaseous phase constant.

The molar fraction of ethylene in the liquid phase is 0.028 and that of propylene is 0.253.

A block copolymer is thus obtained, with a productivity prod of 3653, which exhibits the following properties:

Sol=3.2

AD=500

MFI=5.4

Ethylene content in the final block copolymer=9% by weight.

Examples 2 to 4

These examples illustrate the production of block copolymers according to the invention in which the polymer (a) is a homopolymer of propylene and in which the polymer (b) is an ethylene-propylene copolymer containing an α,ω-diene: 1,9-decadiene.

The catalytic solid used in carrying out these examples is that of Example 1.

The block copolymer is obtained by repeating the procedure of Example I but by introducing the α,ω-diene after the degassing of the autoclave to 3 bars for the preparation of the polymer (b).

The conditions for the production of these block copolymers as well as their properties are reproduced in Table I.

TABLE I

| Examples | 2 | 3 | 4 |
|---|---|---|---|
| Preparation of the Polymer (b) | | | |
| α,ω-Diene used (ml) | 5 | 10 | 50 |
| Molar fraction of ethylene in the liquid phase | 0.028 | — | 0.028 |
| Molar fraction of propylene in the liquid phase | 0.253 | — | 0.253 |
| Molar fraction of α,ω-diene in the liquid phase | 1.5 × 10$^3$ | — | 0.015 |
| Polymerization results | | | |
| prod | 3653 | 3741 | 3787 |
| Amount of polymer (b) | 18 | 18 | 18 |
| Amount of polymer (a) | 82 | 82 | 82 |
| Sol | 1.7 | 1.4 | 1.2 |
| AD | 507 | 507 | 508 |
| MFI | 1 | 0.9 | 0.2 |
| Ethylene content in the final block copolymer (% by weight) | 6 | 6 | 6 |

Comparison of these results with those of Example 1 given by way of reference enables the low level of soluble material observed when the polymerization is carried out in the presence of α,ω-diene, as well as the good morphology of the block copolymers obtained, to be demonstrated.

Examination of the curves reproduced in the single figure clearly shows that the block copolymers according to the present invention exhibit the phenomenon of stress hardening.

Example 5

Example 2 is repeated, except as regards the polymerization time for the stage for formation of the polymer (b) (1.5 hours) and as regards the amount of α,ω-diene used (20 ml).

The properties of the block copolymer obtained are:

prod=3833; Amount of polymer (a)=73; Amount of polymer (b)=27; Sol=2.2; AD=489; MFI=0.2; Ethylene content in the final block copolymer=12% by weight.

Example 6R

Example 5 is repeated, the introduction of the α,ω-diene being omitted.

The properties of the block copolymer obtained are:

prod=3833; Amount of polymer (a)=73; Amount of polymer (b)=27; Sol=4.0; AD=487; MFI=3.2; Ethylene content in the final block copolymer=12% by weight.

Reference Example 7R and Example According to the invention 8

A. Preparation of the Catalytic Solid

The catalytic solid is prepared as described in Example 1R, part A but the final treatment with propylene being omitted.

B. Preparation of the Block Copolymers

Example 7R is carried out by repeating Part B of Example 1R. The block copolymer according to Example 8 is obtained by repeating Example 2. The properties of the block copolymers obtained are reproduced in Table II below.

TABLE II

| Examples | 7R | 8 |
| --- | --- | --- |
| prod | 3339 | 3450 |
| Amount of polymer (b) | 18 | 18 |
| Amount of polymer (a) | 82 | 82 |
| Sol | 3.8 | 3 |
| AD | 486 | 488 |
| MFI | 11.6 | 1.9 |
| Ethylene content in the final block copolymer | 8 | 8 |
| Flex. Mod. | 1350 | 1378 |
| g | 680 | 675 |
| Izod | 3.7 | 4.2 |
| Embrit. Temp. | −23 | −33 |

Comparison of these results enables the better impact strength/stiffness compromise of the block copolymers according to the invention to be demonstrated.

What is claimed is:

1. A propylene block copolymer, comprising:
   (a) 100 parts by weight of a polymer (a) of propylene selected from homopolymers and copolymers of propylene not containing more than 60 by weight of ethylene and/or of an alpha-olefin having from 4 to 6 carbon atoms, and
   (b) from 1 to 100 parts by weight of a polymer (b) of ethylene selected from copolymers of ethylene containing at least 30% and not more than 90% by weight of propylene, the polymer (b) additionally containing from approximately 0.001 to approximately 20% by weight, with respect to the total weight of the block copolymer comprising polymer (A) of propylene and polymer (B) of ethylene, of α,ω-diene-derived monomer units.

2. The block copolymer according to claim 1, wherein the α,ω-diene contains from 6 to 30 carbon atoms.

3. The block copolymer according to claim 2, wherein the α,ω-diene is selected from the group consisting of 1,6-heptadiene, 1-7-octadiene, 1,8-nonadiene, 1,9-decadiene, 1,10-undecadiene, 1,11-dodecadiene, 1,12-tridecadiene and 1,13-tetradecadiene.

4. The block copolymer according to claim 3, wherein the α,ω-diene is 1,9-decadiene.

5. The block copolymer according to claim 1, wherein the concentration of α,ω-diene-derived monomer units is from 0.02 to 10% by weight with respect to the total weight of the block copolymer comprising polymer (A) of propylene and polymer (B) of ethylene.

6. The block copolymer according to claim 1, comprising:
   100 parts by weight of a homopolymer of propylene, and
   from 10 to 80 parts by weight of an ethylene copolymer containing from 40 to 60% by weight of propylene and in addition from approximately 0.02 to approximately 5% by weight with respect to polymer (b) of monomer units derived from an α,ω-diene.

7. The block copolymer according to claim 1 wherein said copolymer exhibits stress hardening.

8. The block copolymer according to claim 1 exhibiting an MFI of less than 1 g/10 min.

9. In a process for the production of shaped articles by extrusion blow-moulding or injection blow-moulding the improvement comprising so moulding a block copolymer according to claim 1.

10. In process for the production of shaped articles by thermoforming or coating articles, the improvement comprising thermoforming or coating articles with a block copolymer according to claim 1.

11. In a process for the formation of foams, the improvement comprising forming a block copolymer according to claim 1.

12. Block copolymer according to claim 1 exhibiting compatibility between the polymers (a) and (b).

13. A process for the production of a block copolymer comprising at least two successive polymerization stages in which a mixture of monomers is contacted with a catalytic system, under polymerizing conditions, comprising in a first stage, a mixture of monomer containing:
   from approximately 45 to 100% by weight of propylene and which can in addition contain
      up to approximately 5% by weight of ethylene and/or of an alpha-olefin having from 4 to 6 carbon atoms and
      up to approximately 50% by weight of α,ω-diene; and,
   in a second stage, a mixture of ethylene, of propylene and of α,ω-diene containing ethylene and:
      up to approximately 90% by weight of propylene and
      up to approximately 50% by weight of α,ω-diene, the minimum amount of α,ω-diene being at least 0.005% by weight.

14. The process according to claim 13, applied to the production of a propylene block copolymer comprising:
   (a) 100 parts by weight of a polymer (a) of propylene selected from homopolymers and copolymers of propylene not containing more than 6% by weight of ethylene and/or of an alpha-olefin having from 4 to 6 carbon atoms, and
   (b) from 1 to 100 parts by weight of a polymer (b) of ethylene selected from copolymers of ethylene containing at least 30% and not more than 90% by weight of propylene, the polymer (b) additionally containing from approximately 0.001 to approximately 20% by weight, with respect to the total weight of the block copolymer comprising polymer (A) of propylene and polymer (B) of ethylene, of α,ω-diene-derived monomer units.

15. Process according to claim 13, in which the α,ω-diene is used only in the second stage.

16. Process according to claim 13, in which the polymerization is carried out in suspension in an aliphatic hydrocarbon.

17. The process according to claim 16, in which the amounts of the monomers used are such that:

in the first stage, the ratio of the molar fractions of ethylene and of propylene in the liquid phase is less than or equal to approximately 0.015 and the ratio of the molar fractions of α,ω-diene and of propylene in the liquid phase is less than or equal to approximately 5 and in the second stage, the ratio of the molar fractions of ethylene and of propylene in the liquid phase is greater than or equal to approximately 0.06 and less than or equal to approximately 0.14 and the ratio of the molar fractions of α,ω-diene and of propylene in the liquid phase is less than or equal to approximately 5.

18. The process according to claim 17, in which exclusively propylene is used in the first stage.

19. The process according to claim 13, in which the polymerization is carried out by means of a catalytic system containing a complexed solid comprising $TiCl_3$ and an activator chosen from organoaluminium compounds.

20. The process according to claim 19, in which the complexed catalytic solid comprising $TiCl_3$ has been subjected to a prepolymerization treatment so as to incorporate therein at least 50% by weight of polymer with respect to the weight of $TiCl_3$.

* * * * *